United States Patent
Acar et al.

(10) Patent No.: US 10,009,179 B2
(45) Date of Patent: Jun. 26, 2018

(54) TRUSTED PLATFORM MODULE (TPM) PROTECTED DEVICE

(71) Applicant: Microsoft Technology Licensing, LLC, Redmond, WA (US)

(72) Inventors: Tolga Acar, Sammamish, WA (US); Matt Pisut, Issaquah, WA (US); Doug Barlow, Sammamish, WA (US); Michael Stark, Renton, WA (US); Trent Byfield, Seattle, WA (US); Alex McKelvey, Seattle, WA (US); Malcolm Pearson, Kirtland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 149 days.

(21) Appl. No.: 14/954,012

(22) Filed: Nov. 30, 2015

(65) Prior Publication Data
US 2017/0155513 A1    Jun. 1, 2017

(51) Int. Cl.
*H04L 9/32* (2006.01)
*H04L 9/14* (2006.01)
(Continued)

(52) U.S. Cl.
CPC ....... *H04L 9/3247* (2013.01); *G06Q 20/3227* (2013.01); *H04L 9/14* (2013.01);
(Continued)

(58) Field of Classification Search
CPC ................. H04L 2209/72; G06Q 20/3227
(Continued)

(56) References Cited

U.S. PATENT DOCUMENTS

| 7,802,111 B1 | 9/2010 | Tahan | |
| 8,009,829 B2 * | 8/2011 | Jueneman | H04L 9/3066 380/277 |

(Continued)

FOREIGN PATENT DOCUMENTS

| WO | 2015124726 A1 | 8/2015 | |
| WO | WO 2015124726 A1 * | 8/2015 | ........... H04L 9/3265 |

OTHER PUBLICATIONS

"International Search Report and Written Opinion Issued in PCT Application No. PCT/US16/060113", dated Feb. 24, 2017, 16 Pages.

(Continued)

*Primary Examiner* — Hadi S Armouche
*Assistant Examiner* — Khalil Naghdali
(74) *Attorney, Agent, or Firm* — Jonathan M. Waldman

(57) ABSTRACT

Example apparatus and methods provide a device (e.g., smartphone) that is more secure for electronic commerce. An example device includes a trusted platform module (TPM) that stores a public key and a private key. The device is provisioned with account information, user information, and device information. The TPM uses the account, user, and device information to acquire attestation credentials and endorsement credentials. The device uses the account, user and device information along with the attestation credentials and endorsement credentials to acquire limited use keys (LUKs) that are encrypted with the public key. The LUKs will only be decrypted as needed to support an actual transaction at the time of the transaction. Before decrypting an LUK, the TPM will authenticate a user of the device at the time of the transaction using. for example, a personal identification number (PIN), fingerprint, or other personal information.

20 Claims, 8 Drawing Sheets

(51) Int. Cl.
  *H04L 9/30* (2006.01)
  *G06Q 20/32* (2012.01)
(52) U.S. Cl.
  CPC ............ *H04L 9/30* (2013.01); *H04L 2209/24* (2013.01); *H04L 2209/72* (2013.01)
(58) Field of Classification Search
  USPC ......................................................... 713/189
  See application file for complete search history.

(56) References Cited

U.S. PATENT DOCUMENTS

| | | | |
|---|---|---|---|
| 8,620,818 | B2 | 12/2013 | Hughes et al. |
| 9,118,666 | B2 | 8/2015 | Naguib |
| 9,276,910 | B2 * | 3/2016 | Tang .................. G06Q 20/3278 |
| 2005/0166051 | A1 | 7/2005 | Buer |
| 2008/0022412 | A1 | 1/2008 | Challener et al. |
| 2013/0019105 | A1 * | 1/2013 | Hussain .................. G06F 21/10 713/189 |
| 2014/0236842 | A1 | 8/2014 | Salminen et al. |
| 2014/0289833 | A1 | 9/2014 | Briceno et al. |
| 2015/0178724 | A1 | 6/2015 | Ngo et al. |
| 2016/0063480 | A1 * | 3/2016 | Ballesteros ........ G06Q 20/3227 705/17 |
| 2016/0218875 | A1 * | 7/2016 | Le Saint ............... H04L 9/0822 |
| 2017/0111170 | A1 * | 4/2017 | Baghdasaryan ...... H04L 9/0866 |

OTHER PUBLICATIONS

Recommendations of the National Institute of Standards and Technology; Guidelines on Hardware-Rooted Security in Mobile Devices; Lily Chen. Joshua Franklin, Andrew Regenscheid; Oct. 2012.

"International Preliminary Report on Patentability Issued in PCT Application No. PCT/US2016/060113", dated Dec. 1, 2017, 10 Pages.

\* cited by examiner

TRUSTED PLATFORM MODULE (TPM) PROTECTED DEVICE

BACKGROUND

People have been purchasing goods and services for a long time. For as long as people have been purchasing goods and services, other people have been interested in stealing goods and services. One way to steal goods and services is to impersonate a bona fide purchaser. Over time, sophisticated anti-impersonation protocols have developed for conventional purchases.

Recently, people have been using smartphones and other mobile devices to purchase goods and services. Hackers and other thieves have attempted to steal from or otherwise compromise the purchasers through the smartphones or other mobile devices. Smartphones and other mobile devices are not without defenses. For example, smartphones and other mobile devices may include a trusted platform module (TPM) that provides some cryptographic and other security functionality. While some conventional security approaches have developed that include TPM based protection, a web of trust is only as strong as its weakest thread. Thus, improvements that provide more secure devices and purchases are constantly sought.

SUMMARY

This Summary is provided to introduce, in a simplified form, a selection of concepts that are further described below in the Detailed Description. This Summary is not intended to identify key features or essential features of the claimed subject matter, nor is it intended to be used to limit the scope of the claimed subject matter.

Example apparatus and methods concern a trusted platform module (TPM) protected device (e.g., smartphone) that will be able to engage in more secure transactions (e.g., purchases). One example apparatus includes a TPM circuit that stores a TPM key pair having a TPM public key and a TPM private key. Access to the TPM private key is restricted to the TPM circuit. The apparatus acquires identity values for both a user of the apparatus and the TPM circuit in the apparatus. The TPM keys are used to produce tokens from these identity values. The tokens and TPM keys are then used to acquire an attestation certificate and endorsement certificate that increase the level of trust for information provided from the apparatus to a transaction credentialing service or provider. For example, the apparatus may acquire a limited use key (LUK) from an LUK provider located off the apparatus. The LUK is encrypted by the LUK provider using the TPM public key and is received in response to providing the TPM public key, the user token, the device token, information associated with the attestation certificate, and information associated with the endorsement certificate to the LUK provider. When a transaction involving the apparatus and a point-of-sale (POS) device occurs, the POS device may provide a payment request. At transaction time, the TPM circuit may add an extra layer of security by acquiring a credential (e.g., personal identification number (PIN), fingerprint, iris scan, etc.) from the user and only after authenticating the credential, decrypting the LUK using the TPM private key. In this way, the LUK is protected both in transit (e.g., when delivered from the LUK provider to the apparatus) and at rest (e.g., in persisted store such as flash memory, and in memory on the apparatus). The TPM circuit may then provide a transaction data that is used to produce a cryptogram involved in advancing or completing the transaction.

More generally, an example method may be performed in a mobile device (e.g., smartphone, tablet). The method may include initializing a TPM in the smartphone with a public key that will be exposed outside the TPM and with a private key that will not be exposed outside the TPM. Access to the plaintext private key is restricted to the TPM. The method may also include provisioning the mobile device with a commerce credential (e.g., attestation certificate, endorsement certificate). This provisioning may be protected by cryptography performed by the TPM module. The provisioning may include providing the public key to an external commerce credentialing provider. The method may also include provisioning the mobile device with a transaction credential (e.g., LUK). This provisioning is also protected by cryptography performed by the TPM. The provisioning includes providing the public key and a portion of the commerce credential to an external transaction credentialing provider. The method may also include performing a transaction using the transaction credential.

BRIEF DESCRIPTION OF THE DRAWINGS

The accompanying drawings illustrate various example apparatus, methods, and other embodiments described herein. It will be appreciated that the illustrated element boundaries (e.g., boxes, groups of boxes, or other shapes) in the figures represent one example of the boundaries. In some examples, one element may be designed as multiple elements or multiple elements may be designed as one element. In some examples, an element shown as an internal component of another element may be implemented as an external component and vice versa. Furthermore, elements may not be drawn to scale.

DETAILED DESCRIPTION

Figure 1:
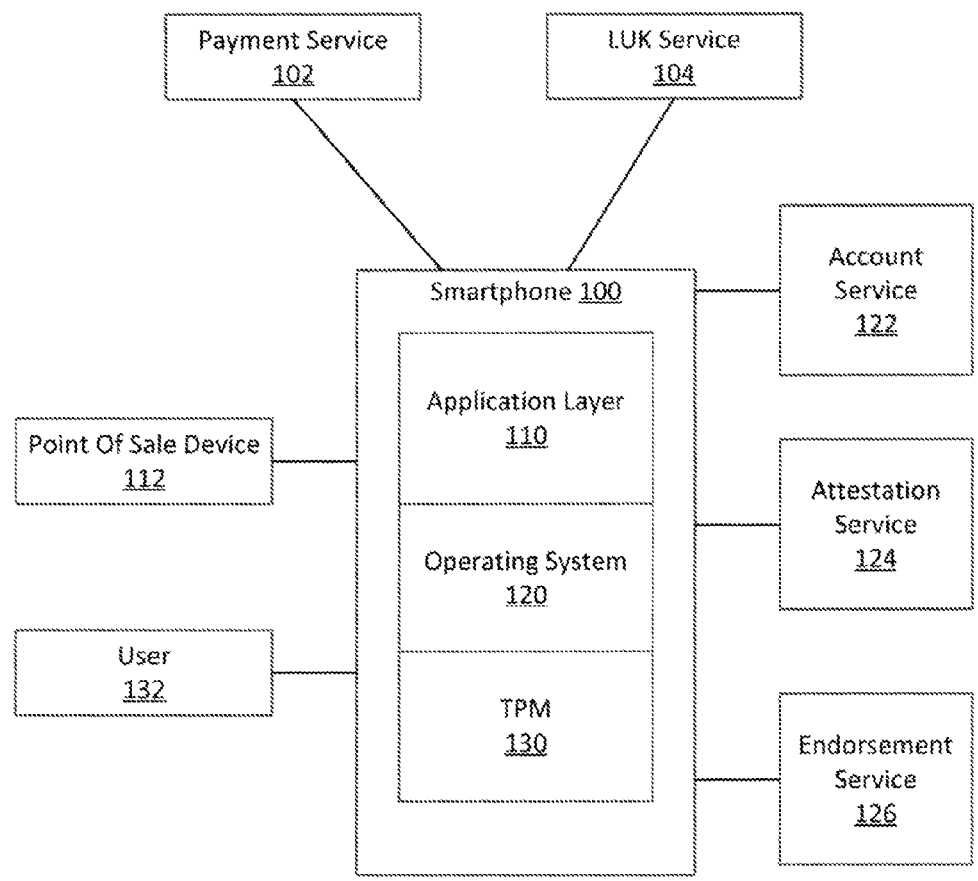
FIG. 1 illustrates an example environment in which a TPM protected device may operate.

Example apparatus and methods concern improving security for commerce performed using a personal device (e.g., smartphone, tablet). FIG. 1 illustrates an example environment in which a TPM protected device (e.g., smartphone 100) may operate. The smartphone 100 may interact with an account service 122 that provides information about a relationship between the smartphone 100, an account, and a TPM 130 in the smartphone 100. The account service 122 may provide user identification information and device identification information that may be cryptographically manipulated or protected by the TPM 130 in subsequent interactions with additional services. For example, the smartphone 100 may interact with an attestation service 124 and an endorsement service 126 that will provide attestation credentials (e.g., attestation certificate) or endorsement credentials (e.g., endorsement certificate). "Certificate" is used herein in its computer security context (e.g., certificate authority). The certificates may then be used to increase the confidence level of information provided by the smartphone 100 when acquiring transaction credentials (e.g., LUK).

The smartphone 100 may interact with a payment service 102 and an LUK service 104 that provision the smartphone with transaction credentials. The transaction credentials may be provided to the smartphone 100 after information from the smartphone 100 has been evaluated. For example, the certificates, the tokens, and the public key may be evaluated. If a threshold level of confidence is achieved for the information provided by the smartphone 100, then a transaction credential (e.g., LUK) may be provided to the smartphone 100. Unlike conventional systems, the LUK may be encrypted before it is provided to the smartphone 100. The LUK may be encrypted using the public key associated with the TPM 130. The LUK may then remain encrypted on the smartphone 100 and thus be inaccessible in an unencrypted form to processes running at an application layer 110 or operating system layer 120 in the smartphone 100.

The smartphone 100 may then interact with a point of sale (POS) device 112 that is supporting a transaction (e.g., purchase) being made by a user 132. The POS device 112 may present a payment request to the smartphone 100. Unlike conventional systems that may just hand over a cryptogram in response to a payment request, smartphone 100 may challenge the user 132 for a credential (e.g., PIN, fingerprint, iris) and only proceed with the transaction if the challenge is authenticated. Once the user 132 is authenticated as an authorized user of the smartphone 100, the TPM 130 may finally decrypt the encrypted LUK that was received from the LUK service 104. The decryption will not involve the user credential. Smartphone 100 thus exhibits several improvements over conventional systems.

Figure 2:
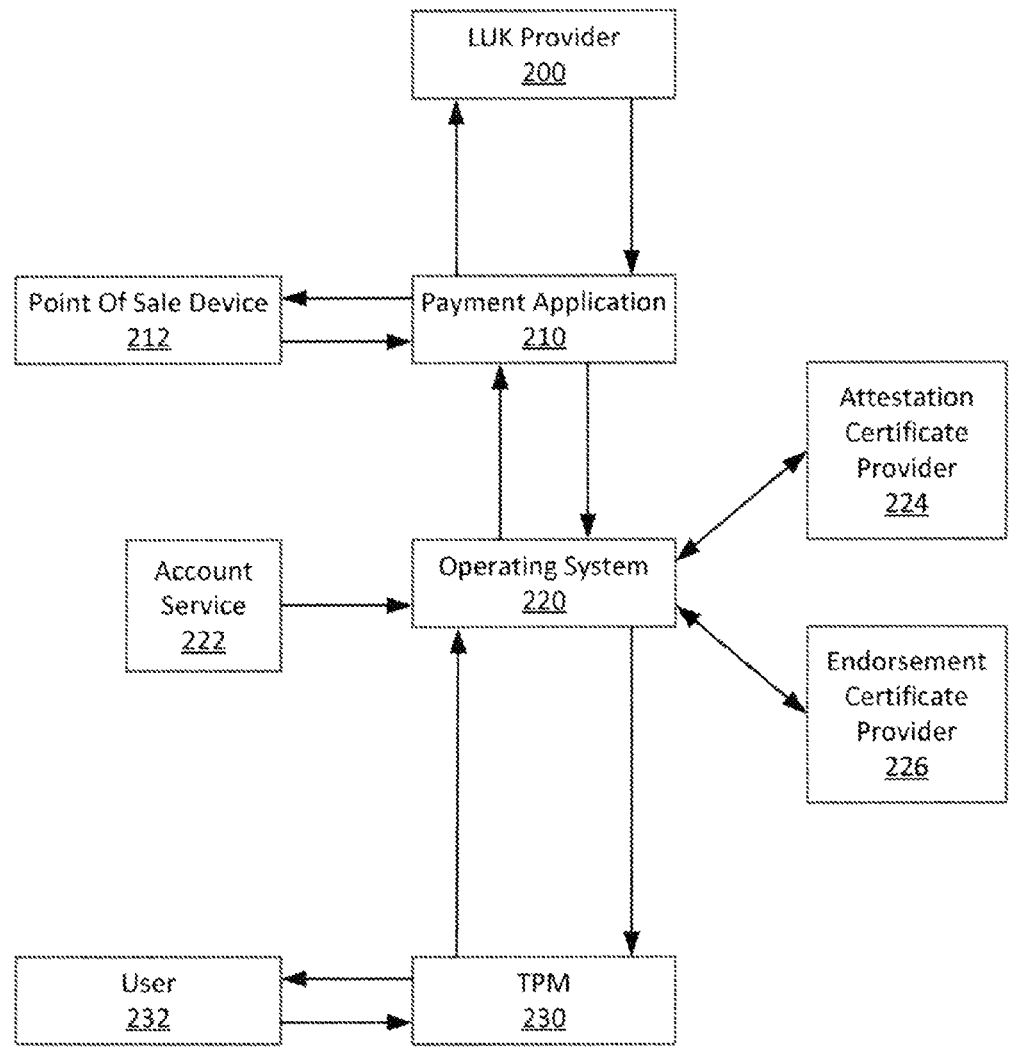
FIG. 2 illustrates an example data flow associated with a TPM protected device.

FIG. 2 illustrates an example data flow associated with a TPM protected device. An account service 222 may provide information (e.g., User ID, Device ID) to an operating system 220. The User ID and Device ID may be used by a TPM 230 to produce a user token and a device token. The TPM 230 may have generated and stored seeds that will be used by a random number generator in cryptographic operations performed by the TPM 230. The TPM 230 may produce an attestation key AIK and an endorsement key EK. The TPM 230 may store a private key TPMpriv and a public key TPMpub. The TPMpub, user token, device token, and AIK may be provided to an attestation certificate provider 224 that will selectively return an attestation certificate. Similarly, The TPMpub, user token, device token, and EK may be provided to an endorsement certificate provider 226 that will selectively return an endorsement certificate.

A payment application 210 may then make a request to an LUK provider 200 for an LUK to be used in a subsequent transaction. The request may include the TPMpub, user token, device token, information associated with the AIK or attestation certificate, and information associated with the EK or endorsement certificate. Upon validating the information provided in the LUK request, the LUK provider 200 may provide an encrypted LUK to the operating system 220. The encrypted LUK will be encrypted with the TPMpub key provided with the LUK request.

A user 232 may use the payment application 210 to interact with a POS device 212. While the transaction is in progress, the TPM 230 may authenticate the user 232. If the authentication succeeds, then the TPM 230 may decrypt the encrypted LUK to produce materials that will be used to conclude the transaction.

Some portions of the detailed descriptions that follow are presented in terms of algorithms and symbolic representations of operations on data bits within a memory. These algorithmic descriptions and representations are used by those skilled in the art to convey the substance of their work to others. An algorithm is considered to be a sequence of operations that produce a result. The operations may include creating and manipulating physical quantities that may take the form of electronic values. Creating or manipulating a physical quantity in the form of an electronic value produces a concrete, tangible, useful, real-world result.

It has proven convenient at times, principally for reasons of common usage, to refer to these signals as bits, values, elements, symbols, characters, terms, numbers, distributions, and other terms. It should be borne in mind, however, that these and similar terms are to be associated with the appropriate physical quantities and are merely convenient labels applied to these quantities. Unless specifically stated otherwise, it is appreciated that throughout the description, terms including processing, computing, and determining, refer to actions and processes of a computer system, logic, processor, system-on-a-chip (SoC), or similar electronic device that manipulates and transforms data represented as physical quantities (e.g., electronic values).

Example methods may be better appreciated with reference to flow diagrams. For simplicity, the illustrated methodologies are shown and described as a series of blocks. However, the methodologies may not be limited by the order of the blocks because, in some embodiments, the blocks may occur in different orders than shown and described. Moreover, fewer than all the illustrated blocks may be required to implement an example methodology. Blocks may be combined or separated into multiple components. Furthermore, additional or alternative methodologies can employ additional, not illustrated blocks.

Figure 3:
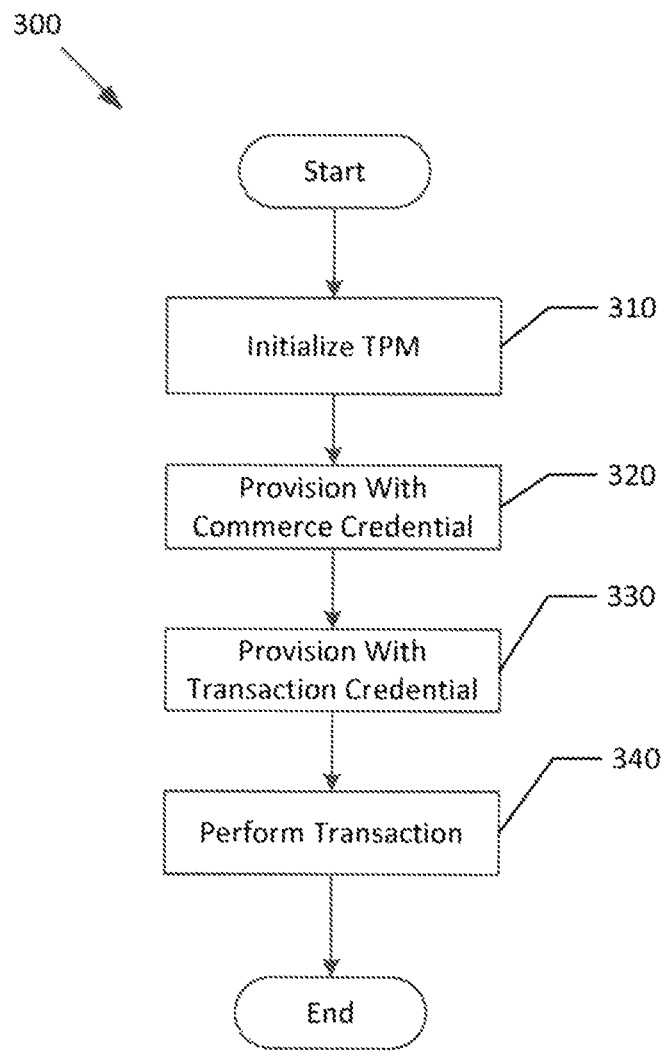
FIG. 3 illustrates an example method associated with a TPM protected device.
Figure 4:
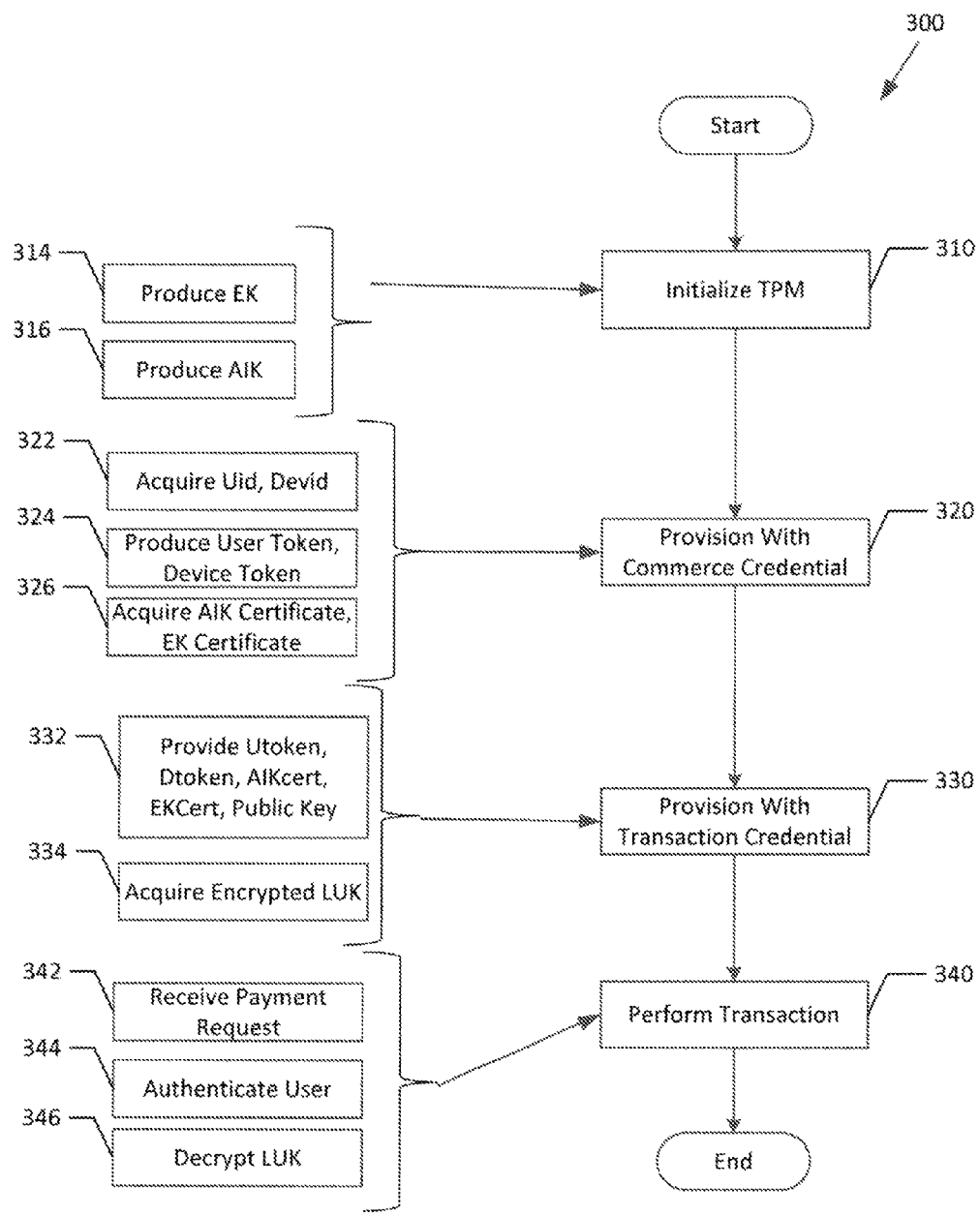
FIG. 4 illustrates an example method associated with a TPM protected device.

FIGS. 3 and 4 illustrate an example method 300 associated with a TPM protected device. Method 300 may be performed in a smartphone. While a smartphone is described, more generally method 300 may be performed in a device (e.g., tablet, computer) that includes a TPM. Method 300 includes, at 310, initializing a TPM. Method 300 also includes, at 320, provisioning the smartphone with a commerce credential. Method 300 also includes, at 330, provisioning the smartphone with a transaction credential (e.g., LUK). Method 300 also includes, at 340, performing a transaction using the provisioned smartphone.

Initializing the TPM in the smartphone at 310 includes accessing a public key that will be exposed outside the TPM and a private key that will not be exposed outside the TPM. Access to the plaintext private key is restricted to the TPM. Some of the public keys and private keys may be manufactured into the TPM. For example, when the TPM is implemented in computer hardware or computer firmware, some of the TPM keys may be burnt into or programmed into a circuit at manufacture time or at least before distribution to a user, and some keys may be generated from a random number on demand.

Initializing the TPM at 310 may include, at 314, producing an endorsement key (EK) and, at 316, producing an attestation key (AIK).

Method 300 also includes, at 320, provisioning the smartphone with a commerce credential. This provisioning may be protected, at least in part, by cryptography performed by the TPM module. For example, information sent to or received from a commerce credentialing provider may be encrypted with the TPM public key or with another public key for which the commerce credentialing provider knows the corresponding private key. The provisioning at 320 may include providing the public key to an external commerce credentialing provider.

In one embodiment, provisioning the smartphone with the commerce credential at 320 includes acquiring, at 322, a user identification data from a commerce account provider. The user identification data identifies an authorized user of the smartphone for commerce. The user may have established an account using a different device and a portion of the account information or information about the user may then be provided to a smartphone that the user intends to use for commerce. For example, a user may have set up an account for a store using their laptop at home. The user may then want to shop at the store using their smartphone.

In one embodiment, provisioning the smartphone with the commerce credential at 320 may include acquiring, at 322, a device identification data from the commerce account provider. The device identification data identifies the smartphone for commerce. For example, the manufacturer of the TPM on the smartphone may have provided some TPM identification information to the commerce account provider. The commerce account provider may use this information to restrict which devices are allowed to interact with a user account.

In one embodiment, provisioning the smartphone with the commerce credential at 320 may include, at 324, producing a user token from the user identification data and the device identification data. At least a portion of the user token may be protected by cryptography performed by the TPM. For example, the user token may include information from the user identification that is encrypted using a public key for which another actor knows the corresponding private key and may also include information from the device identification that is also encrypted using a public key. This facilitates creating a linkage between the user and the device after the user has already created an account and after the device has already been identified to the account provider.

In one embodiment, provisioning the smartphone with the commerce credential at 320 may include, at 324, producing a device token from the device identification data. At least a portion of the device token may be protected by cryptography performed by the TPM. For example, the device identifier or information associated with the device identifier may be encrypted using a public key for which an external service knows the private key, or the device identifier or information associated with the device identifier may be signed using a key that is encrypted by a public key for which TPM knows the private key.

In one embodiment, provisioning the smartphone with the commerce credential at 320 may include, at 326, acquiring an attestation certificate. The attestation certificate may be acquired in response to providing the user token, the device token, the attestation key, and the public key to the external commerce credentialing provider. Additionally, provisioning the smartphone with the commerce credential at 320 may include, at 326, acquiring an endorsement certificate in response to providing the user token, the device token, the endorsement key, and the public key to the external commerce credentialing provider. The external commerce credentialing provider may employ asymmetric keys to protect communications at 324. For example, communications to the external commerce credentialing provider may be encrypted using a public key associated with the external commerce credentialing provider and communications back to the smartphone may be encrypted with the TPM public key. While a single external commerce credentialing provider is described, multiple difference providers (e.g., attestation server, endorsement server) may provide commerce credentials.

"Attestation" is used herein in its computer security context. Attestation is the ability of the entity that is requesting a certificate to cryptographically prove to a certificate authority that the key in the certificate request is protected by a TPM that the certificate authority trusts. "Endorsement" is also used herein in its computer security context.

Method 300 also includes, at 330, provisioning the smartphone with a transaction credential. Once again, this provisioning is protected at least in part by cryptography performed by the TPM module. For example, information provided to a transaction credential provider may be encrypted using a public key for which the transaction credential provider holds the private key. This provisioning includes providing the TPM public key and a portion of the commerce credential to an external transaction credentialing provider. Provisioning the smartphone with the transaction credential may include acquiring a limited use key (LUK) that is encrypted by the external transaction credentialing provider using the TPM public key. The external transaction credentialing provider may encrypt the LUK before providing it to the smartphone but after validation of the user token, the device token, the commerce credential, and the public key provided by the smartphone. Thus, the LUK is protected by the TPM during transmission to the smartphone, which is an improvement over conventional systems.

Method 300 also includes, at 340, performing a transaction using the transaction credential. Performing the transaction using the transaction credential includes, at 342, receiving a payment request from the POS device. For example, a shopper may be at a store, make an order, and then bump the POS device to initiate a near field communication (NFC) with the POS. The POS may send a payment request to the smartphone. To further improve security, the smartphone may, upon receiving the payment request from the POS device, ask for and receive a credential from the shopper engaged in the transaction that caused the payment request. If the shopper is successfully authenticated as the authorized user of the smartphone at 344, then method 300 may proceed, at 346, to decrypt the LUK using the private key. Once the LUK has been decrypted, information for producing a cryptogram to provide to the POS device may be provided to advance the transaction. In one embodiment, the information for producing the cryptogram is derived, at least in part, from the decrypted LUK.

While FIGS. 3 and 4 illustrate various actions occurring in serial, it is to be appreciated that various actions illustrated in FIGS. 3 and 4 could occur substantially in parallel. By way of illustration, a first process could initialize the TPM, a second process could provision the smartphone with a commerce credential, a third process could provision the smartphone with a transaction credential, and a fourth process could perform the transaction. While four processes are described, it is to be appreciated that a greater or lesser number of processes could be employed and that lightweight processes, regular processes, threads, and other approaches could be employed.

In one example, a method may be implemented as computer executable instructions. Thus, in one example, a computer-readable storage device may store computer executable instructions that if executed by a machine (e.g., computer) cause the machine to perform methods described or claimed herein including method 300. While executable instructions associated with the above methods are described as being stored on a computer-readable storage device, it is to be appreciated that executable instructions associated with other example methods described or claimed herein may also be stored on a computer-readable storage device. In different embodiments, the example methods described herein may be triggered in different ways. In one embodiment, a method may be triggered manually by a user. In another example, a method may be triggered automatically.

Figure 5:
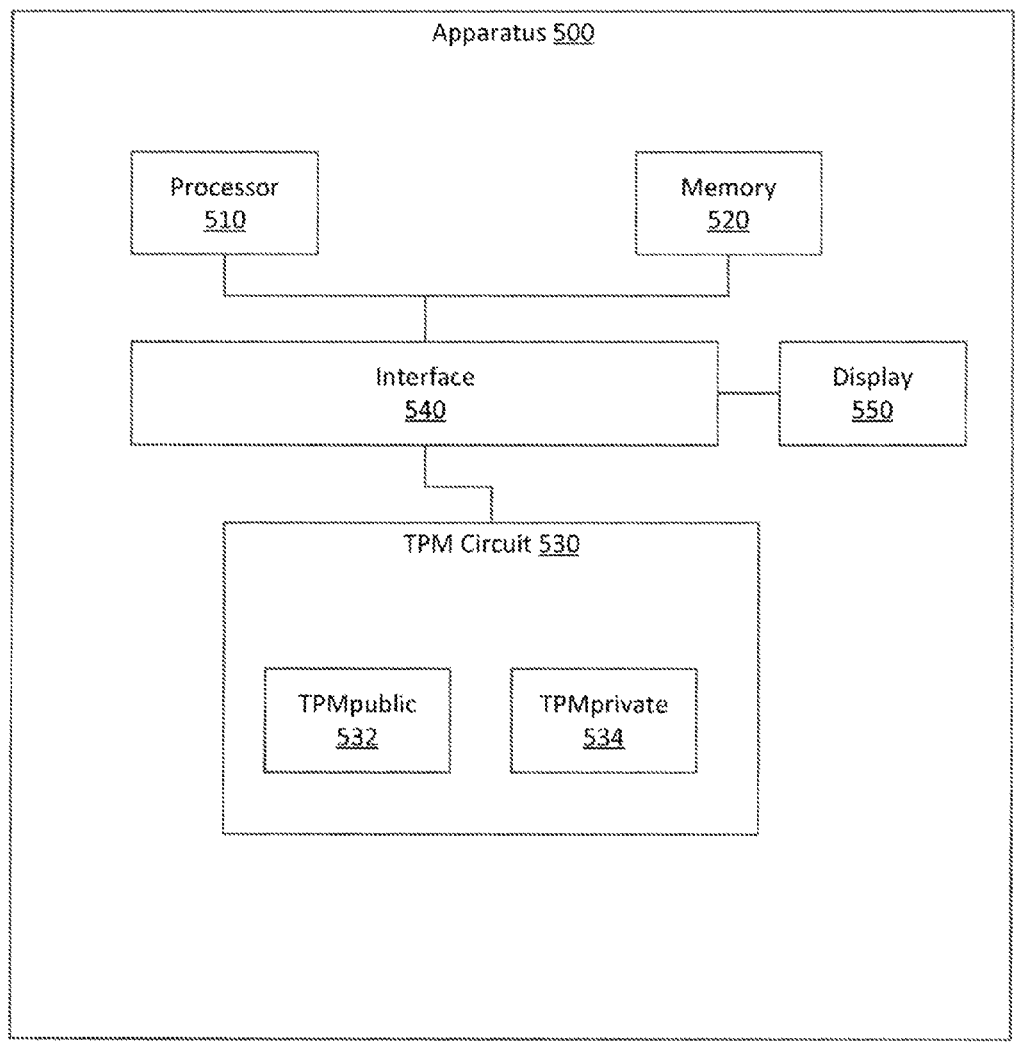
FIG. 5 illustrates an example apparatus operating as an example TPM protected device.

FIG. 5 illustrates an apparatus 500 that operates as an example TPM protected device. Apparatus 500 may be, for example, a smartphone, a tablet computer, a personal digital assistant, or other computer hardware based apparatus. Apparatus 500 may include a processor 510, a memory 520, a TPM circuit 530, a display 550, and a hardware interface 540 that connects the processor 510, the memory 520, the display 550, and the TPM circuit 530. The processor 510 may be, for example, a microprocessor in a computer, a specially designed circuit, a field-programmable gate array (FPGA), an application specific integrated circuit (ASIC), a system-on-a-chip, a dual or quad processor, or other computer hardware. The memory 520 may store data associated with a transaction or instructions to be executed by processor 510.

Apparatus 500 may interact with other apparatus, processes, and services through, for example, a telephony system, a computer network, a data communications network, or voice communication network. In one embodiment, the functionality associated with the TPM circuit 530 may be performed, at least in part, by hardware logic components including, but not limited to, FPGAs, ASICs, application specific standard products (ASSPs), SOCs, or complex programmable logic devices (CPLDs).

TPM circuit 530 stores a TPM key pair comprising a TPM public key and a TPM private key. Access to the TPM private key is restricted to the TPM circuit 530. Thus, an operating system or application being run by processor 510 do not have access to the cleartext TPM private key in the TPM circuit 530. In one embodiment, the TPM key pair may be an RSA asymmetric pair. In another embodiment, the TPM key pair may be an ECC key pair. The ECC may be, for example, ECDSA or ECDH algorithms as defined in FIPS 186 and SP800-56 over prime order fields.

Before engaging in a transaction (e.g., purchase), apparatus 500 has to be provisioned. Thus, apparatus 500 acquires, from a trusted account service located off the apparatus 500, a user identity value associated with a user of the apparatus 500 and a device identity value associated with the apparatus 500. The trusted account service may be run by the device manufacturer, the operating system manufacturer, payment application provider, a store at which the user wants to shop, by a credit card provider, by a bank, or by some other entity with which a shopper has an account. The user identity value and the device identity value facilitate establishing and maintaining the relationship between the shopper, the apparatus 500, and the account.

The apparatus 500 generates an encrypted user token from the user identity value and the device identity value using functionality or data provided by the TPM. For example, a portion of the user token may be encrypted with the TPM public key, a key encrypted by a TPM key, or another key. The apparatus 500 also generates an encrypted device token from the device identity value functionality or data provided by the TPM. For example, a portion of the device token may be encrypted with the TPM public key or another key.

The TPM circuit 530 acquires an attestation certificate from an attestation certificate provider that is located off the apparatus 500. The TPM circuit 530 acquires the attestation certificate after providing the TPM public key, the user token, and the device token to the attestation certificate provider. If the information provided to the attestation certificate provider withstands scrutiny at the provider (e.g., achieves a desired level of trust), then the attestation certificate is provided to the apparatus 500. Acquiring the attestation certificate provides information that the apparatus 500 can provide to other entities (e.g., LUK provider) that will facilitate achieving a desired level of trust.

The TPM circuit 530 acquires an endorsement certificate from an endorsement certificate provider that is located off the apparatus 500. The TPM circuit 530 acquires the endorsement certificate after providing the TPM public key, the user token, and the device token to the endorsement certificate provider. If the information provided to the endorsement certificate provider withstands scrutiny at the provider (e.g., achieves a desired level of trust), then the endorsement certificate is provided to the apparatus 500. Acquiring the endorsement certificate provides information that the apparatus 500 can provide to other entities (e.g., LUK provider) that will facilitate achieving a desired level of trust.

The processor 510 executes instructions stored in memory 520 that cause apparatus 500 to acquire an LUK from an LUK provider located off the apparatus 500. The LUK is encrypted by the LUK provider using the TPM public key. The LUK is received by the apparatus 500 from the LUK provider in response to the apparatus 500 providing the TPM public key, the user token, the device token, information associated with the attestation certificate, and information associated with the endorsement certificate to the LUK provider. In one embodiment, to provide increased security, the LUK provider provides the LUK after validating the user token and the device token, and after determining that the TPM public key is endorsed by the attestation service and the endorsement service. Validating the user token and the device token may include determining that the user token and the device token are protected by cryptography performed by the TPM circuit 530.

Once the apparatus 500 has the user token, the device token, the attestation certificate, the endorsement certificate, and an LUK, the apparatus 500 is ready to be used for a purchase or other transaction. Thus, processor 500 executes instructions stored in memory 520 to acquire a payment request from a POS device at which a transaction is performed by the user using the apparatus 500. Once the payment request is received, the TPM circuit 530 acquires a credential from the user. Upon authenticating the credential, the TPM circuit 530 decrypts the LUK using the TPM private key. The credential acquired from the user may be, for example, a PIN or a biometric value (e.g., fingerprint, iris). The TPM circuit 530 decrypts the LUK independent of the credential.

The TPM circuit 530 then provides transaction data to the processor 510 for answering the payment request with a cryptogram or other form of secure data. The transaction data may be cryptographically protected by information acquired from the decrypted LUK.

In one embodiment, the apparatus 500 interacts with the POS device using near field communications (NFC). For example, a shopper may have their items rung up by a cashier, and then tap their smartphone against the POS to initiate the NFC.

Figure 6:
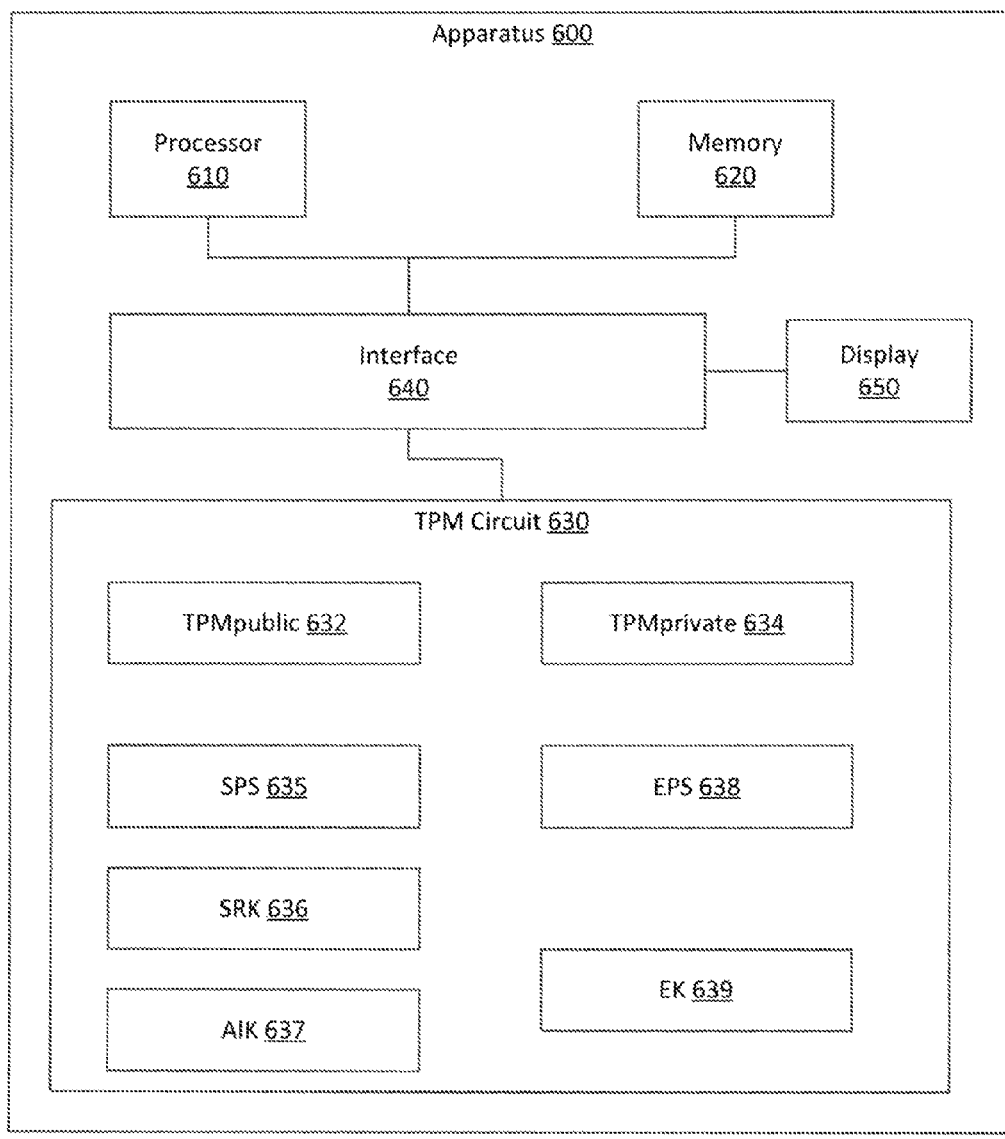
FIG. 6 illustrates an example apparatus operating as an example TPM protected device.

FIG. 6 illustrates an apparatus 600 that is similar to apparatus 500 (FIG. 5). For example, apparatus 600 includes a processor 610, a memory 620, a TPM circuit 630, a display 650, and an interface 640. However, apparatus 600 also provides more information about seeds and keys stored in TPM circuit 630.

In this embodiment, the TPM circuit 630 generates and stores a storage primary seed (SPS) 635 and an endorsement primary seed (EPS) 638. These seeds may then be used by a random number generator in the TPM circuit 630 to produce additional RSA keys. For example, the TPM circuit 630 may generate and store a storage root key (SRK) 636 using the SPS 635. To improve security over conventional devices, access to the SPS 635, the EPS 638, and the SRK 636 is restricted to the TPM circuit 630.

In this embodiment, the TPM circuit 630 generates and stores an endorsement key pair (EK) 639 using the EPS 638. The TPM circuit 630 thus acquires the endorsement certificate in response to providing the TPM public key 632, the user token, the device token, and a member of the EK 639 to the endorsement certificate provider.

In this embodiment, the TPM circuit 630 also generates and stores an attestation key pair (AIK) 637 using the SRK 636. The TPM circuit 630 acquires the attestation certificate in response to providing the TPM public key 632, the user token, the device token, and a member of the AIK 637 to the attestation certificate provider.

In this embodiment, the TPM circuit 630 generates the user token using cryptography that employs the SRK 636. Similarly, the TPM circuit 630 generates the device token using cryptography that employs the SRK 636.

Figure 7:
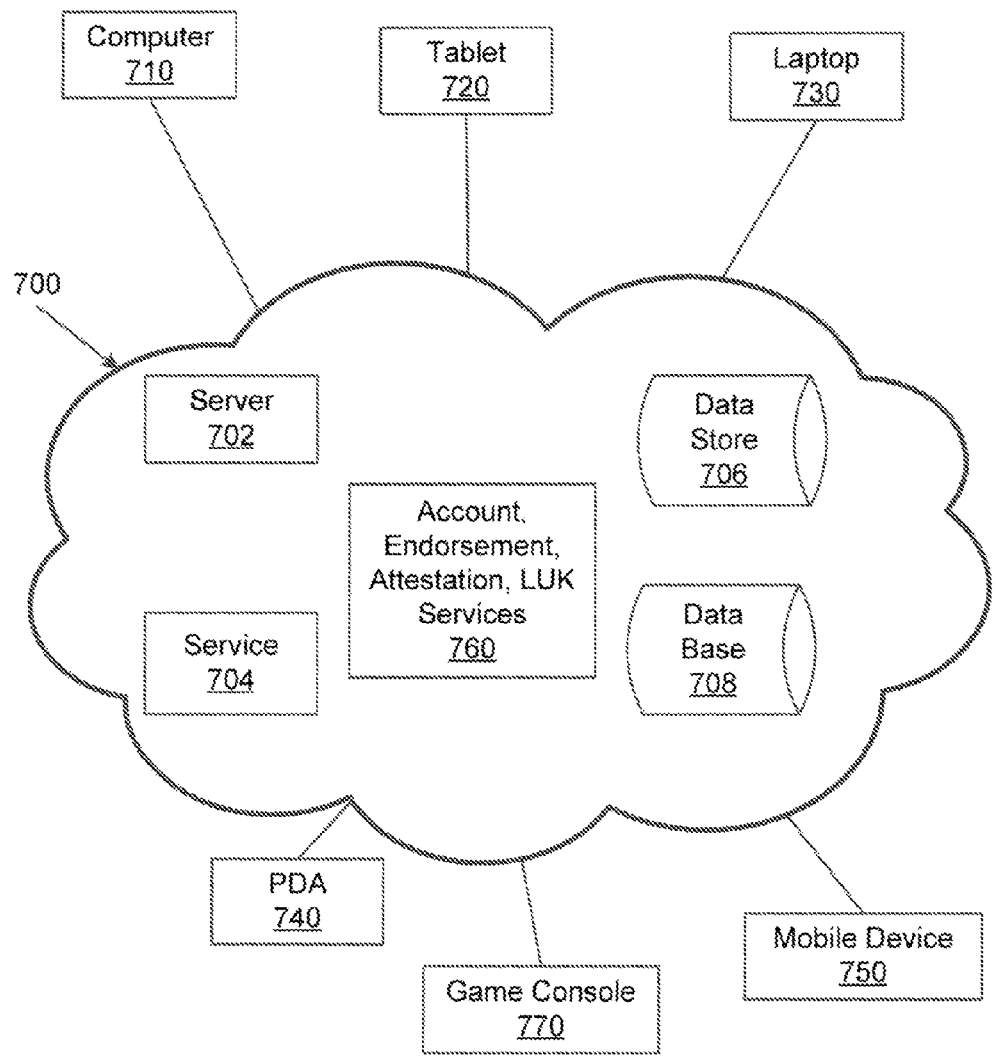
FIG. 7 illustrates an example cloud operating environment in which a service associated with an example system or method may operate.

FIG. 7 illustrates an example cloud operating environment 700. A cloud operating environment 700 supports delivering computing, processing, storage, data management, applications, and other functionality as an abstract service rather than as a standalone product. Services may be provided by virtual servers that may be implemented as one or more processes on one or more computing devices. In some embodiments, processes may migrate between servers without disrupting the cloud service. In the cloud, shared resources (e.g., computing, storage) may be provided to computers including servers, clients, and mobile devices over a network. Different networks (e.g., Ethernet, Wi-Fi, 802.x, cellular) may be used to access cloud services. Users interacting with the cloud may not need to know the particulars (e.g., location, name, server, database) of a device that is actually providing the service (e.g., computing, storage). Users may access cloud services via, for example, a web browser, a thin client, a mobile application, or in other ways.

FIG. 7 illustrates example services 760 residing in the cloud. The services 760 may include an account service, an endorsement service, an attestation service, and an LUK service. The services 760 may rely on a server 702 or service 704 to perform processing and may rely on a data store 706 or database 708 to store data. While a single server 702, a single service 704, a single data store 706, and a single database 708 are illustrated, multiple instances of servers, services, data stores, and databases may reside in the cloud and may, therefore, be used by the services 760.

FIG. 7 illustrates various devices accessing the services 760 in the cloud. The devices include a computer 710, a tablet 720, a laptop computer 730, a personal digital assistant 740, a mobile device (e.g., cellular phone, satellite phone, wearable computing device) 750, a game console 770, or a hybrid device that combines multiple form factors and features in a configurable package. The devices accessing the services may include a TPM to facilitate providing more secure transactions (e.g., purchases). The devices may access the services 760 to acquire credentials that provision the devices, to acquire a limited use key that provisions the devices, or for other reasons. The communications between the devices and the services 760 may be protected by cryptography performed by the TPM in the devices. It is possible that different users at different locations using different devices may access the services 760 through different networks or interfaces.

Figure 8:
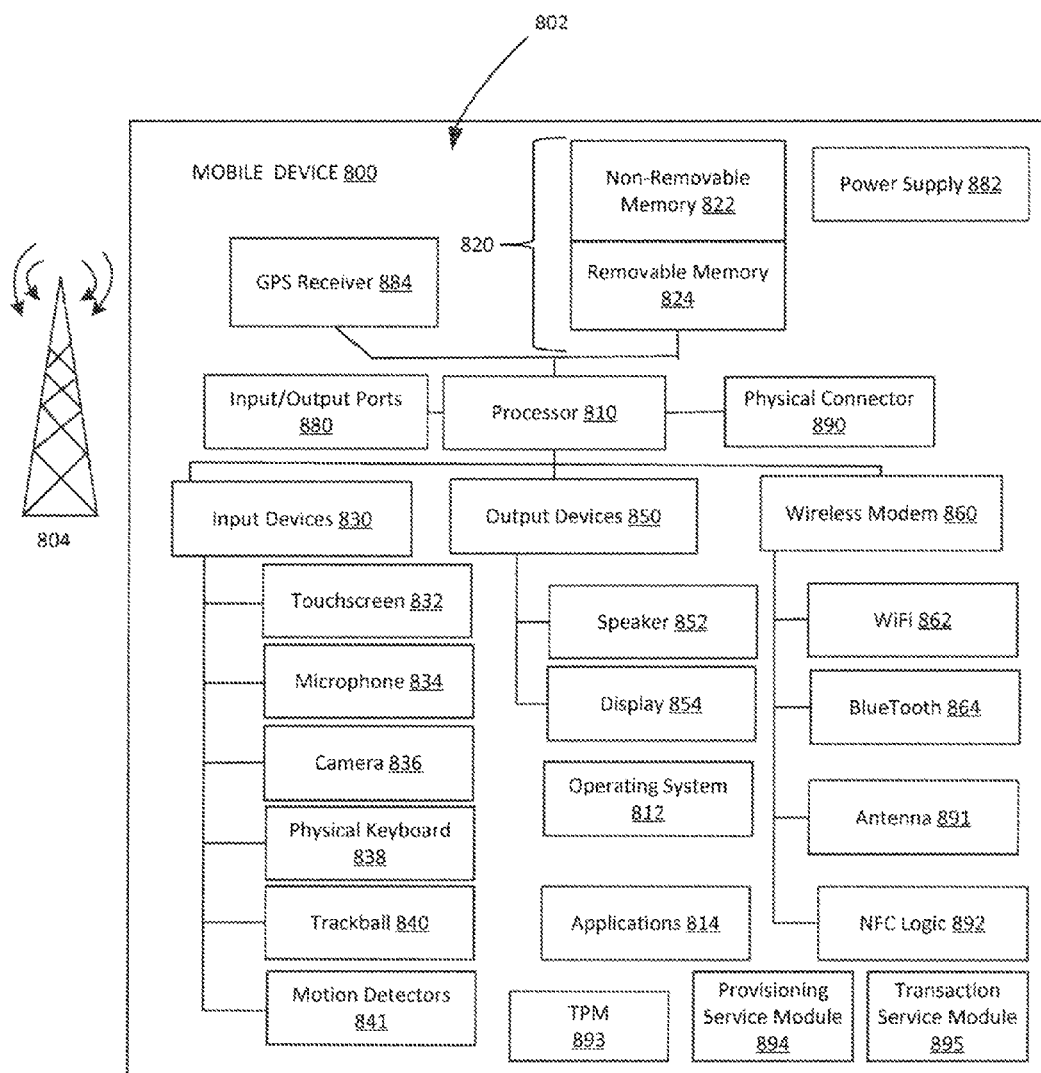
FIG. 8 is a system diagram depicting an exemplary mobile communication device that may function as an example TPM protected device.

FIG. 8 is a system diagram depicting an exemplary mobile device 800 that includes a variety of optional hardware and software components, shown generally at 802. Components 802 in the mobile device 800 can communicate with other components, although not all connections are shown for ease of illustration. The mobile device 800 may be a variety of computing devices (e.g., cell phone, smartphone, handheld computer, Personal Digital Assistant (PDA), wearable computing device, game console) and may allow wireless two-way communications with mobile communications networks 804 (e.g., cellular network, satellite network).

Mobile device 800 may include a controller or processor 810 (e.g., signal processor, microprocessor, ASIC, or other control and processing logic circuitry) for performing tasks including signal coding, data processing, input/output processing, power control, or other functions. An operating system 812 can control the allocation and usage of the components 802 and support application programs 814.

Mobile device 800 can include memory 820. Memory 820 can include non-removable memory 822 or removable memory 824. The non-removable memory 822 can include random access memory (RAM), read only memory (ROM), flash memory, a hard disk, or other memory storage technologies. The removable memory 824 can include flash memory or a Subscriber Identity Module (SIM) card, which is well known in GSM communication systems, or other memory storage technologies, such as "smart cards." The memory 820 can be used for storing data or code for running the operating system 812 and the applications 814. Example data can include instructions for provisioning the mobile device 800, for identifying the mobile device 800, for identifying an authorized user of the mobile device 800, or other data. The memory 820 can be used to store a subscriber identifier, such as an International Mobile Subscriber Identity (IMSI), and an equipment identifier, such as an International Mobile Equipment Identifier (IMEI). The identifiers can be transmitted to a network server to identify users or equipment.

The mobile device 800 can support input devices 830 including, but not limited to, a touchscreen 832, a microphone 834, a camera 836, a physical keyboard 838, or trackball 840. The mobile device 800 may also support output devices 850 including, but not limited to, a speaker 852 and a display 854. Other possible output devices (not shown) can include piezoelectric or other haptic output devices. Some devices can serve more than one input/output function. For example, touchscreen 832 and display 854 can be combined in a single input/output device. The input devices 830 can include a Natural User Interface (NUI). An NUI is an interface technology that enables a user to interact with a device in a "natural" manner, free from artificial constraints imposed by input devices such as mice, keyboards, remote controls, and others. Examples of NUI methods include those relying on speech recognition, touch and stylus recognition, gesture recognition (both on screen and adjacent to the screen), air gestures, head and eye tracking, voice and speech, vision, touch, gestures, and machine intelligence. Other examples of a NUI include motion gesture detection using accelerometers/gyroscopes, facial recognition, three dimensional (3D) displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 812 or applications 814 can include speech-recognition software as part of a voice user interface that allows a user to operate the device 800 via voice commands. Further, the device 800 can include input devices and software that allow for user interaction via a user's spatial gestures, such as detecting and interpreting gestures to provide input associated with a transaction (e.g., purchase). The input devices 830 may also include motion sensing input devices (e.g., motion detectors 841).

A wireless modem 860 can be coupled to an antenna 891. In some examples, radio frequency (RF) filters are used and the processor 810 need not select an antenna configuration for a selected frequency band. The wireless modem 860 can support two-way communications between the processor 810 and external devices. The modem 860 is shown generically and can include a cellular modem for communicating with the mobile communication network 804 and/or other radio-based modems (e.g., Bluetooth 864 or Wi-Fi 862). The wireless modem 860 may be configured for communication with one or more cellular networks, such as a Global system for mobile communications (GSM) network for data and voice communications within a single cellular network, between cellular networks, or between the mobile device and a public switched telephone network (PSTN). NFC logic 892 facilitates having near field communications (NFC).

The mobile device 800 may include at least one input/output port 880, a power supply 882, a satellite navigation system receiver 884, such as a Global Positioning System (GPS) receiver, or a physical connector 890, which can be a Universal Serial Bus (USB) port, IEEE 1394 (FireWire) port, RS-232 port, or other port. The illustrated components 802 are not required or all-inclusive, as other components can be deleted or added.

Mobile device 800 may include a TPM 893 that is configured to provide a functionality for the mobile device 800. For example, TPM 893 may store keys and seeds and may perform cryptography. Mobile device 800 may also include a provisioning service module 894. The provisioning service module 894 may be, for example, a circuit, firmware, or other computer hardware. Provisioning service module 894 may provide a client for interacting with a service (e.g., services 760, FIG. 7). Mobile device 800 may also include a transaction service module 895. The transaction service module 895 may be, for example, a circuit, firmware, or other computer hardware. The transaction service module 895 may also provide a client for interacting with a service (e.g., services 760. FIG. 7). Portions of the example methods described herein may be performed by TPM 893, provisioning service module 894, or transaction service module 895.

Aspects of Certain Embodiments

In one embodiment, an apparatus includes a processor, a memory that stores instructions for execution by the processor, and a TPM circuit that stores a TPM key pair comprising a TPM public key and a TPM private key.

In one embodiment, access to the TPM private key is restricted to the TPM circuit.

In one embodiment, the apparatus acquires, from a trusted account service located off the apparatus, a user identity value associated with a user of the apparatus and a device identity value associated with the apparatus.

In one embodiment, the apparatus generates an encrypted user token from the user identity value and the device identity value using functionality or data provided by the TPM circuit.

In one embodiment, the apparatus generates an encrypted device token from the device identity value using functionality or data provided by the TPM circuit.

In one embodiment, in response to providing the TPM public key, the user token, and the device token to an attestation certificate provider located off the apparatus, the TPM circuit acquires an attestation certificate from the attestation certificate provider.

In one embodiment, in response to providing the TPM public key, the user token, and the device token to an endorsement certificate provider located off the apparatus, the TPM circuit acquires an endorsement certificate from the endorsement certificate provider.

In one embodiment, the processor executes instructions stored in the memory to acquire an LUK from an LUK provider located off the apparatus.

In one embodiment, the LUK is encrypted by the LUK provider using the TPM public key, and the LUK is received in response to providing the TPM public key, the user token, the device token, information associated with the attestation certificate, and information associated with the endorsement certificate to the LUK provider.

In one embodiment, the processor executes instructions stored in the memory to acquire a payment request from a POS device at which a transaction is performed by the user using the apparatus.

In one embodiment, the TPM circuit, upon detecting receipt of the payment request, acquires a credential from the user and, upon authenticating the credential, decrypts the LUK using the TPM private key, and provides a transaction data to the processor for answering the payment request with a cryptogram or other secure data. The transaction data is cryptographically protected by information acquired from the LUK.

Like other TPMs, the TPM circuit may include seeds and keys from which other keys or key pairs may be produced.

In one embodiment, the TPM circuit generates an endorsement key pair using the EPS seed and acquires the endorsement certificate in response to providing the TPM public key, the user token, the device token, and a member of the endorsement key pair to the endorsement certificate provider.

In one embodiment, the TPM circuit generates an attestation key pair using the SRK and acquires the attestation certificate in response to providing the TPM public key, the user token, the device token, and a member of the attestation key pair to the attestation certificate provider.

In one embodiment, the TPM circuit generates the user token using cryptography based, at least in part, on the SRK and generates the device token using cryptography based, at least in part, on the SRK.

In one embodiment, the LUK provider provides the LUK after validating the user token and the device token, and after determining that the TPM public key is endorsed by the attestation service and the endorsement service. Validating the user token and the device token includes determining that the user token and the device token are protected by cryptography performed by the TPM circuit.

In one embodiment, the apparatus interacts with the POS device using NFC.

In one embodiment, the credential acquired from the user is a personal identification value or a biometric value and the TPM circuit decrypts the LUK independent of the credential.

In one embodiment, a method is performed in a device (e.g., smartphone).

In one embodiment, the method includes initializing a TPM in the smartphone by accessing a public key that will be exposed outside the TPM and by accessing a private key that will not be exposed outside the TPM. Access to the cleartext private key is restricted to the TPM.

In one embodiment, the method includes provisioning the smartphone with a commerce credential. The provisioning is protected, at least in part, by cryptography performed by the TPM and includes providing the public key to an external commerce credentialing provider.

In one embodiment, the method includes provisioning the smartphone with a transaction credential. The provisioning is protected at least in part by cryptography performed by the TPM and includes providing the public key and a portion of the commerce credential to an external transaction credentialing provider.

In one embodiment, the method includes performing a transaction using the transaction credential.

In one embodiment, initializing the TPM includes producing one or more seeds in the TPM and producing an endorsement key and an attestation key using cryptography that employs the one or more seeds, where access to the one or more seeds is restricted to the TPM.

In one embodiment, provisioning the smartphone with the commerce credential includes acquiring a user identification data from a commerce account provider. The user identification data identifies an authorized user of the smartphone for commerce.

In one embodiment, provisioning the smartphone with the commerce credential includes acquiring a device identification data from the commerce account provider. The device identification data identifies the smartphone for commerce.

In one embodiment, provisioning the smartphone with the commerce credential includes producing a user token from the user identification data and the device identification data. At least a portion of the user token is protected by cryptography or data provided by the TPM.

In one embodiment, provisioning the smartphone with the commerce credential includes producing a device token from the device identification data. At least a portion of the device token is protected by cryptography or data provided by the TPM.

In one embodiment, provisioning the smartphone with the commerce credential includes acquiring an attestation certificate in response to providing the user token, the device token, the attestation key, and the public key to the external commerce credentialing provider.

In one embodiment, provisioning the smartphone with the commerce credential includes acquiring an endorsement certificate in response to providing the user token, the device token, the endorsement key, and the public key to the external commerce credentialing provider.

In one embodiment, provisioning the smartphone with the transaction credential includes acquiring an LUK that is encrypted by the external transaction credentialing provider using the TPM public key after validation of the user token, the device token, the commerce credential, and the public key.

In one embodiment, performing the transaction using the transaction credential includes, upon receiving a payment request from a POS device, receiving a credential from a person using the smartphone to engage in the transaction that caused the payment request.

In one embodiment, performing the transaction using the transaction credential includes, upon successfully authenticating the person as the authorized user, decrypting the LUK using the private key and providing information for producing a cryptogram or other secure information to provide to the POS device to advance the transaction. The information for producing the cryptogram is derived, at least in part, from the decrypted LUK.

In one embodiment, a smartphone includes first computer hardware that provides a TPM, second computer hardware that provides a provisioning service, and third computer hardware that provides a transaction service.

In one embodiment, the TPM stores a TPM key pair comprising a public key and a private key. The TPM key pair are unique to the smartphone and are permanently recorded in the first computer hardware. Access to the private key is limited to the first computer hardware.

In one embodiment, the TPM generates an SPS that is used to produce an attestation key pair in the TPM using cryptography that is based, at least in part, on the TPM key pair and generates an EPS that is used to produce an endorsement key pair in the TPM using cryptography that is based, at least in part, on the TPM key pair.

In one embodiment, the TPM authenticates a user of the smartphone involved in a transaction as an authorized user of the smartphone using personal information of the user acquired at the time of the transaction.

In one embodiment, the provisioning service acquires information concerning an identity of the authorized user of the smartphone, acquires information concerning an identity of the TPM, acquires information that increases an attestation confidence associated with the TPM key pair and the identity of the user, acquires information that increases an endorsement confidence associated with the TPM key pair and the identity of the user, and acquires a transaction credential for use by the transaction service during a sales transaction in which the smartphone participates, where the transaction credential is encrypted with the public key.

In one embodiment, the transaction service employs the TPM to decrypt the transaction credential to acquire cryptographic information to be used in protecting the transaction upon determining that the user of the smartphone is the authorized user of the smartphone.

Definitions

The following includes definitions of selected terms employed herein. The definitions include various examples or forms of components that fall within the scope of a term and that may be used for implementation. The examples are not intended to be limiting. Both singular and plural forms of terms may be within the definitions.

References to "one embodiment", "an embodiment", "one example", and "an example" indicate that the embodiment (s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable storage device", as used herein, refers to a device that stores instructions or data. "Computer-readable storage device" does not refer to propagated signals. A computer-readable storage device may take forms, including, but not limited to, non-volatile media, and volatile media. Non-volatile media may include, for example, optical disks, magnetic disks, tapes, and other media. Volatile media may include, for example, semiconductor memories, dynamic memory, and other media. Common forms of a computer-readable storage devices may include, but are not limited to, a floppy disk, a flexible disk, a hard disk, a magnetic tape, other magnetic medium, an application specific integrated circuit (ASIC), a compact disk (CD), a random access memory (RAM), a read only memory (ROM), a memory chip or card, a memory stick, and other media from which a computer, a processor or other electronic device can read.

"Logic", as used herein, includes but is not limited to hardware, firmware, or combinations of each to perform a function(s) or an action(s), or to cause a function or action from another logic, method, or system. Logic may include a software controlled microprocessor, a discrete logic (e.g., ASIC), an analog circuit, a digital circuit, a programmed logic device, a memory device containing instructions, and other physical devices. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the Applicant intends to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
   a trusted platform module (TPM) that stores a TPM key pair comprising a TPM public key and a TPM private key, where access to the TPM private key is restricted to the TPM;
   a processor;
   a memory that stores instructions for execution by the processor; and
   a hardware interface that connects the processor, the memory, and the TPM;
   where the apparatus acquires, from a trusted account service located off the apparatus, a user identity value associated with a user of the apparatus and a device identity value associated with the apparatus,
   where the apparatus generates an encrypted user token from the user identity value and the device identity value using cryptography or data provided by the TPM,
   where the apparatus generates an encrypted device token from the device identity value using cryptography or data provided by the TPM,
   where, in response to providing the TPM public key, the encrypted user token, and the encrypted device token to an attestation certificate provider located off the apparatus, the TPM acquires an attestation certificate from the attestation certificate provider;
   where, in response to providing the TPM public key, the encrypted user token, and the encrypted device token to an endorsement certificate provider located off the apparatus, the TPM acquires an endorsement certificate from the endorsement certificate provider,
   where the processor executes instructions stored in the memory to acquire a limited use key (LUK) from an LUK provider located off the apparatus, where the LUK is encrypted by the LUK provider using the TPM public key, and where the LUK is received in response to providing the TPM public key, the encrypted user token, the encrypted device token, information associated with the attestation certificate, and information associated with the endorsement certificate to the LUK provider,
   where the processor executes instructions stored in the memory to acquire a payment request from a point-of-sale (POS) device at which a transaction is performed by the user using the apparatus,
   where the TPM, based at least on detecting receipt of the payment request, acquires a credential from the user and, based at least on authenticating the credential, decrypts the LUK using the TPM private key, and
   where the TPM provides a transaction data to the processor for answering the payment request with a cryptogram, where the transaction data is cryptographically protected by information acquired from the LUK.

2. The apparatus of claim 1, where the TPM comprises a TPM circuit, and where the TPM circuit generates an endorsement key pair using a seed in the TPM circuit.

3. The apparatus of claim 2, where the TPM circuit acquires the endorsement certificate in response to providing the TPM public key, the encrypted user token, the encrypted device token, and a member of the endorsement key pair to the endorsement certificate provider, wherein the endorsement key pair comprises a public key and a private key, and wherein the member of the endorsement key pair is the public key or the private key.

4. The apparatus of claim 2, where the TPM circuit generates an attestation key pair using a seed in the TPM circuit.

5. The apparatus of claim 4, where the TPM circuit acquires the attestation certificate in response to providing the TPM public key, the encrypted user token, the encrypted device token, and a member of the attestation key pair to the attestation certificate provider, wherein the attestation key pair comprises a public key and a private key, and wherein the member of the attestation key pair is the public key or the private key.

6. The apparatus of claim 1, where the LUK provider provides the LUK after validating the encrypted user token and the encrypted device token, and after determining that the TPM public key is endorsed by an attestation service and an endorsement service.

7. The apparatus of claim 6, where validating the encrypted user token and the encrypted device token includes determining that the encrypted user token and the encrypted device token are protected by cryptography performed by the TPM.

8. The apparatus of claim 1, where the apparatus interacts with the POS device using near field communications (NFC).

9. The apparatus of claim 1, where the credential acquired from the user is a personal identification value or a biometric value and where the TPM decrypts the LUK independent of the credential.

10. The apparatus of claim 1, where the TPM key pair is an Elliptic Curve Cryptography (ECC) key pair.

11. The apparatus of claim 1, where the TPM key pair is an RSA asymmetric pair.

12. The apparatus of claim 1, where the apparatus is a smartphone.

13. The apparatus of claim 1, where the apparatus is a tablet computer, a game console, or a wearable computing device.

14. The apparatus of claim 1, where the apparatus is a hybrid device that combines form factors and features from a smartphone, a tablet computer, a game console, or a wearable computing device.

15. A method performed in a smartphone, comprising:
    initializing a trusted platform module (TPM) in the smartphone by accessing a public key that will be exposed outside the TPM and by accessing a private key that will not be exposed outside the TPM, where access to the private key is restricted to the TPM;
    provisioning the smartphone with a commerce credential, where the provisioning is protected, at least in part, by cryptography performed by the TPM and where the provisioning includes providing the public key to an external commerce credentialing provider;
    provisioning the smartphone with a transaction credential, where provisioning the smartphone with the transaction credential includes acquiring a limited use key (LUK), where the provisioning is protected at least in part by cryptography performed by the TPM and where the provisioning includes providing the public key and a portion of the commerce credential to an external transaction credentialing provider, wherein the portion of the commerce credential comprises at least one of an attestation certificate, an endorsement certificate, a user identification data, a device identification data, a user token, or a device token;
    performing a transaction using the transaction credential based at least on receiving a payment request from a point of sale (POS) device, wherein the transaction caused the payment request; and
    based at least on successfully authenticating an authorized user, decrypting the LUK using the private key.

16. The method of claim 15, where initializing the TPM includes producing an endorsement key and an attestation key based, at least in part, on seeds or keys available in the TPM.

17. The method of claim 16, where provisioning the smartphone with the commerce credential includes:
    acquiring the user identification data from a commerce account provider, where the user identification data identifies an authorized user of the smartphone for commerce;
    acquiring the device identification data from the commerce account provider, where the device identification data identifies the smartphone for commerce;
    producing the user token from the user identification data and the device identification data, where the user token is protected by cryptography performed by the TPM;
    producing the device token from the device identification data, where the device token is protected by cryptography performed by the TPM;
    acquiring the attestation certificate in response to providing the user token, the device token, the attestation key, and the public key to the external commerce credentialing provider; and
    acquiring the endorsement certificate in response to providing the user token, the device token, the endorsement key, and the public key to the external commerce credentialing provider.

18. The method of claim 17, where the limited use key (LUK) is encrypted by the external transaction credentialing provider using the TPM public key after validation of the user token, the device token, the commerce credential, and the public key.

19. The method of claim 18, where performing the transaction using the transaction credential includes:
    based at least on receiving the payment request from the point of sale (POS) device:
        receiving a credential from a person using the smartphone to engage in the transaction that caused the payment request; and
    based at least on successfully authenticating the person as the authorized user:
        decrypting the LUK using the private key; and
        providing information for producing a cryptogram to provide to the POS device to advance the transaction, where the information for producing the cryptogram is derived, at least in part, from the decrypted LUK.

20. A smartphone, comprising:
    first computer hardware that provides a trusted platform module (TPM),
    second computer hardware that provides a provisioning service, and
    third computer hardware that provides a transaction service,
    where the TPM:
        stores a TPM key pair comprising a public key and a private key, where the TPM key pair are unique to the smartphone, where the TPM key pair are recorded in the first computer hardware, and where access to the private key is limited to the first computer hardware;
        generates an attestation key pair in the TPM based, at least in part, on data or cryptography provided by the TPM;
        generates an endorsement key pair in the TPM based, at least in part, on data or cryptography provided by the TPM; and
        authenticates a user of the smartphone involved in a transaction as an authorized user of the smartphone using personal information of the user acquired at time of the transaction,
    where the provisioning service:
        acquires information concerning an identity of the authorized user of the smartphone;
        acquires information concerning an identity of the TPM;
        acquires information that increases a confidence level of information associated with the TPM key pair and the identity of the user;
        and acquires a transaction credential, including a limited use key (LUK), for use by the transaction service during a sales transaction in which the smartphone participates, where the transaction credential is encrypted with the public key,
and
where the transaction service employs the TPM to decrypt the transaction credential, and the LUK using the private key, to acquire cryptographic information to be used in protecting the transaction based at least on determining that the user of the smartphone is the authorized user of the smartphone.

\* \* \* \* \*